(12) United States Patent
Lee et al.

(10) Patent No.: US 11,713,251 B2
(45) Date of Patent: Aug. 1, 2023

(54) METHOD FOR PREPARING POWDERED COMPOSITE CARBIDE OF TUNGSTEN AND TITANIUM

(71) Applicant: NANOTECH Co., Ltd., Chungcheongbuk-do (KR)

(72) Inventors: Hyun Ho Lee, Chungcheongbuk-do (KR); Byeong Ho Choi, Daejeon (KR)

(73) Assignee: NANOTECH Co., Ltd., Chungcheongbuk-Do (KR)

( * ) Notice: Subject to any disclaimer, the term of this patent is extended or adjusted under 35 U.S.C. 154(b) by 736 days.

(21) Appl. No.: 16/645,995

(22) PCT Filed: Nov. 7, 2018

(86) PCT No.: PCT/KR2018/013426
§ 371 (c)(1),
(2) Date: Mar. 10, 2020

(87) PCT Pub. No.: WO2020/040353
PCT Pub. Date: Feb. 27, 2020

(65) Prior Publication Data
US 2020/0207628 A1    Jul. 2, 2020

(30) Foreign Application Priority Data
Aug. 23, 2018    (KR) .................. 10-2018-0098635

(51) Int. Cl.
*C01B 32/907*    (2017.01)
(52) U.S. Cl.
CPC ........ *C01B 32/907* (2017.08); *C01P 2002/74* (2013.01); *C01P 2002/88* (2013.01); *C01P 2004/03* (2013.01); *C01P 2004/62* (2013.01)

(58) Field of Classification Search
None
See application file for complete search history.

(56) References Cited

U.S. PATENT DOCUMENTS 2,113,354 A * 4/1938 McKenna ............... C22C 29/08
423/440
3,859,057 A    1/1975 Stoll et al.

FOREIGN PATENT DOCUMENTS

KR    2001-0055549 A    7/2001
KR    10-1494340 B1    3/2015
(Continued)

OTHER PUBLICATIONS

Baek et al.; KR101694528, translation provided by Google Dec. 17, 2022.*
(Continued)

*Primary Examiner* — Guinever S Gregorio
(74) *Attorney, Agent, or Firm* — The PL Law Group, PLLC

(57) ABSTRACT

A method according to an embodiment of the present invention is for preparing powdered composite carbide of tungsten and titanium in which tungsten trioxide ($WO_3$), titanium dioxide ($TiO_2$) and carbon (C), each being in powdered form are mixed with a reducing agent powder to obtain a reaction mixture in the mixing step, followed by the synthesis step in which the reaction mixture is heated at a temperature of about 600° C. to 1200° C. to obtain the reaction products, and the washing step in which the reaction products are washed with water. The method for preparing tungsten titanium carbide powder is capable of carrying out both reduction and carburizing at a relatively low temperature and affords homogeneity in shape and particle size in the resultant composite carbide.

8 Claims, 6 Drawing Sheets

(56) References Cited

FOREIGN PATENT DOCUMENTS

| KR | 10-2016-0020594 A | 2/2016 |
| KR | 10-1694528 B1 | 1/2017 |
| KR | 10-1743132 B1 | 6/2017 |

OTHER PUBLICATIONS

International Search Report for PCT/KR2018/013426 dated May 16, 2019.

* cited by examiner

METHOD FOR PREPARING POWDERED COMPOSITE CARBIDE OF TUNGSTEN AND TITANIUM

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/013426, filed Nov. 7, 2018, which claims priority to the benefit of Korean Patent Application No. 10-2018-0098635 filed in the Korean Intellectual Property Office on Aug. 23, 2018, the entire contents of which are incorporated herein by reference.

TECHNICAL FIELD

The present invention relates to a method for preparing powdered composite carbide of tungsten and titanium.

BACKGROUND

Powdered composite carbide of tungsten and titanium carbide is a tooling material capable of imparting enhanced hardness and toughness and is widely used in tools for their superior cutting performances. Tungsten titanium composite carbide is a solid solution of tungsten carbide and titanium carbide. It has the benefit of providing improved high temperature characteristics while accommodating the shortcomings of both tungsten carbide and titanium carbide.

High temperature characteristics are vital for tools as they are generally exposed to high temperatures during their use. Powdered titanium carbide (TiC) has great hardness and wear resistance but its brittleness can cause problems for usages such as cutting blades due to high rates of attrition. This problem can be supplemented by employing titanium carbide in solid solution with tungsten carbide (WC), a material of high toughness, in the form of composite powder.

Characteristic properties of powdered tungsten titanium composite carbides improve as they become finer and purer. Accordingly, there are ongoing efforts to develop tungsten titanium carbide powders finer than those sized from 1 to 4 micrometers in current use.

One of the conventional methods for preparing composite powder of titanium and tungsten carbide powders is high energy milling in which powders of tungsten, titanium and carbon are subject to comminution with a ball mill for an extended period of time of 30 hours or longer to produce the powdered composite carbide. This method has the benefit of producing uniform and fine powder, but the long hours required and incorporation of impurities are huge disadvantages.

Another conventional method for producing composite carbide powder is self-propagating high temperature synthesis in which tungsten, titanium and carbon are molded and ignited to combustion by means of a heat source, thereby forming the powder from the heat of reaction generated. This method, however, requires 2500° C. or higher temperatures for powder synthesis upon powder ignition, and thus is not suitable for large scale production of powdered composite carbide of tungsten and titanium.

Fine powders of tungsten titanium composite carbide have been difficult to produce using conventional methods because the high temperature reactions involved in most of them caused abnormal growth of powder grain. This has disadvantaged conventional powders of composite carbide by requiring extended comminution to attain a fine particle size. Thus, despite the strong demand in the field for ultrafine grades of tungsten titanium carbide ranging from a few tens to a few hundreds of nanometers, as mentioned above, there is still a lack in effective methods for preparing ultrafine powders that obviate the additional postsynthetic processing steps such as grinding and heat treatment.

SUMMARY

The present invention has been contemplated to address the above-mentioned technical problem. It is an object of the present invention to provide a method for preparing composite carbide of tungsten and titanium at relatively low temperatures.

It is another object of the present invention to provide a facile method for preparing tungsten titanium composite carbide in a large scale using simple processes.

It is still another object of the present invention to provide a method for preparing tungsten titanium carbide capable of high performance in an ultrafine form.

In order to achieve the above-mentioned objects, the present invention provides a method for preparing tungsten titanium carbide powder, the method comprising the steps of (1) a mixing step for mixing under an inert atmosphere tungsten trioxide ($WO_3$), titanium dioxide ($TiO_2$) and carbon (C), each being in powdered form, with a reducing agent powder to obtain a reaction mixture, (2) a synthesis step for heating the reaction mixture at a temperature of about 600° C.-1200° C. to obtain the reaction products and (3) a washing step for washing the reaction products with water. In the present invention, the reaction mixture has a composition such that the molar amount of the reducing agent is 8(x+y) or lower, and the molar amount of carbon is from about 2.7 times (x+y) to about 8 times (x+y), provided that x is the molar amount of tungsten trioxide and y is the molar amount of titanium dioxide. The reducing agent for the reaction is selected from calcium, magnesium and mixtures thereof, wherein the molar amount of the reducing agent is the sum amount of the calcium and/or magnesium in moles.

In an embodiment of the present invention, the mixing step can be carried out by dry-mixing the entire components of the reaction mixture. In another embodiment, the mixing step can be carried out by wet-mixing the aforementioned components except the reducing agent, followed by drying of the resultant mixture and the dry-mixing the reducing agent therein.

In still another embodiment of the present invention, the washing step is followed by a further washing with aqueous acid to provide powdered tungsten titanium carbide.

The inventive method for preparing composite carbide of tungsten and titanium is advantageous in that ultrafine grades of powdered tungsten titanium carbide is obtainable using low cost materials under relatively low temperatures.

The relatively low temperature process of the present invention allows ready control of powder aggregation and particle growth. The choice of calcium or magnesium as the reducing agent affords overall homogeneity in shape and particle size for the tungsten titanium carbide powder produced through facile mass distribution.

Furthermore, in terms of the make-up of process steps, the present invention provides a method in which reduction and carburizing proceed simultaneously in a single step. The inventive method is also suitable for scaling up production of powdered composite carbide of tungsten and titanium in the commercial scale.

BRIEF DESCRIPTION OF THE DRAWINGS

The accompanying drawings attached to the specification are intended for the purpose of illustrating the preferred embodiments of the present invention only and help to better understand the idea of the present invention with reference to the description below. Accordingly, the present invention should not be unduly limited to what is illustrated therein.

DETAILED DESCRIPTION

Figure 1A:
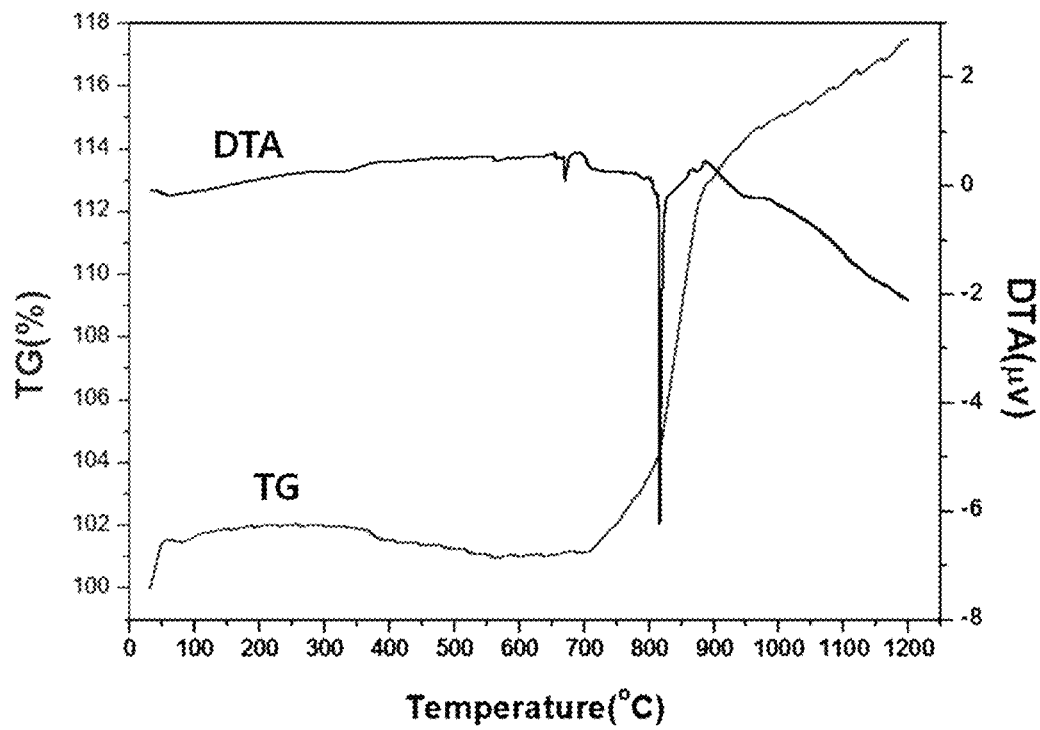
FIGS. 1a and 1b show the simultaneous thermograms of the reaction mixtures according to the embodiments of the present invention (Examples 1 & 4, and Example 2, respectively).
Figure 1B:
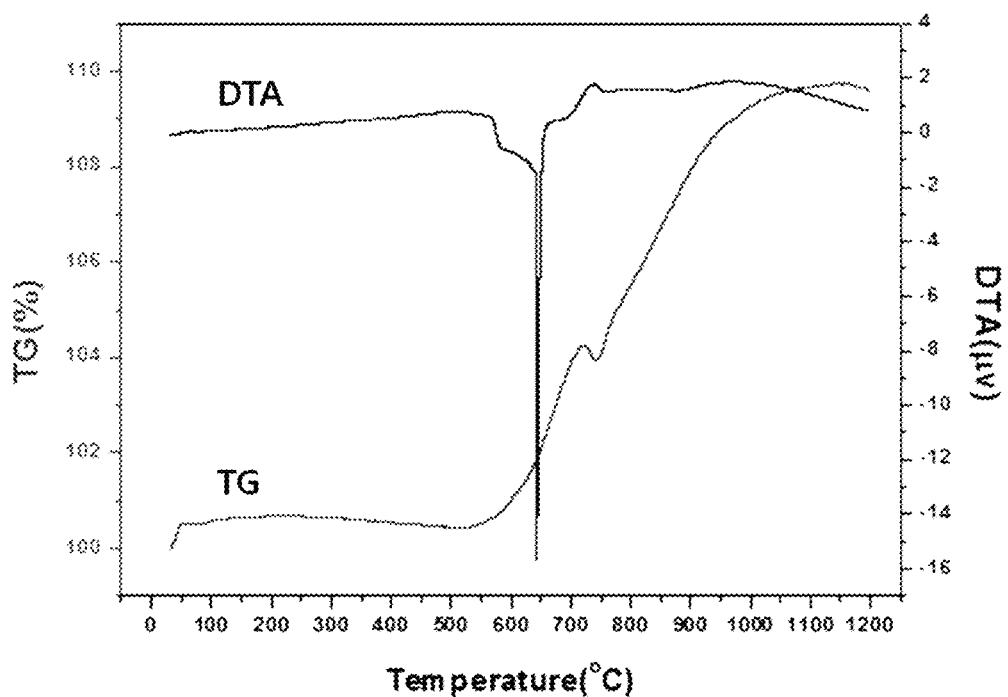

The inventive method for preparing ultrafine powder of tungsten titanium composite carbide powder is explained in detail below. It should be noted beforehand that the interpretation of the terms and words used in the present specification and/or claims should not be limited to their conventional or dictionary meaning, but should be interpreted according to the principle that the inventor is entitled to be his own lexicographer for the purpose of defining his invention in the best way possible, in accordance with the technical idea of the present invention.

The first step of the present invention is a mixing step in which the reactants in their powdered form are mixed under an inert atmosphere to obtain a reaction mixture composed of tungsten trioxide ($WO_3$), titanium dioxide ($TiO_2$), carbon (C) and a reducing agent.

The inert atmosphere of the present invention works to prevent the reducing agent from oxidizing. Any atmosphere that has been purged of oxygen by means of vacuum or inert gas may serve as the inert atmosphere in the present invention. Examples of inert gas atmosphere include nitrogen, argon, hydrogen and methane.

Both anatase and rutile crystal forms can be used as the reactant titanium dioxide in the present invention. In addition, it is preferred that powder with the smallest particle size as possible is selected for the reactants tungsten trioxide and titanium dioxide since this helps to attain tungsten titanium carbide in ultrafine grades.

In consideration of economic factors, reactivity and the desired particle size of the final product, tungsten trioxide and titanium dioxide powders with particle sizes of 10 nm-10 μm are used in specific embodiments of the present invention. Hereinafter, unless explicitly described otherwise in the present specification, by average particle size of a powder it is meant $D_{50}$, the value at 50% level for the number-average particle size when represented as a cumulative distribution. In the inventive method, the reducing agent acts to reduce tungsten trioxide and titanium dioxide thereby enabling their reaction with carbon. In the present invention, calcium, magnesium or mixtures thereof may be used as the reducing agent.

In the present invention, the mixing ratio of the reducing agent to the combined molar amounts of tungsten trioxide and titanium dioxide is suitably chosen as per each combined mole of tungsten trioxide and titanium dioxide, the amount of the reducing agent ranging from about a slight excess in molar equivalent to about 8 moles or less.

In other words, the molar amount of the reducing agent ranges from about the molar equivalent or more to about 8 times x+y or less, provided that the molar amount of tungsten trioxide is x, and the molar amount of titanium dioxide is y.

In the present specification, by the molar amount of the reducing agent, it is meant the combined molar amount of the aforementioned calcium and/or magnesium. If the reducing agent is allowed to react with tungsten trioxide and titanium dioxide in a molar amount of 8 times their combined molar amount or less, conversion and reaction rates for the tungsten trioxide and titanium dioxide can be maintained at high levels, while ensuring production of fine particles of tungsten titanium carbide and preventing the product powder from aggregating. This leads to efficient production of ultrafine particles in a homogeneous fashion.

In the present invention, very fine grades of the reducing agent could be difficult to handle as the reactivity increases as particle size decreases.

The aforementioned mixing step of the present invention can be carried out using either wet mixing or dry mixing. In the case of wet mixing, the synthesis proceeds in which all components of the reactants except the reducing agent are wet-mixed first and then dried, followed by dry-mixing with the reducing agent. In both dry and wet mixing, the reducing agent is mixed in the reaction vessel after an inert atmosphere is formed.

Carbon works to provide the carbon source for tungsten titanium carbide of the present invention. In general, substances known as carbon sources in the field can be used without particular limitation. For instance, activated carbon and carbon black may be used.

In the present invention, the mixing ratio of carbon to the combined molar amount of tungsten trioxide and titanium dioxide is chosen from about 2.7 moles to about 8 moles or less of carbon per each combined mole of tungsten trioxide and titanium dioxide. In other words, the molar amount of carbon ranges from about 2.7 times to about 8 times x+y, provided that the molar amount of tungsten trioxide is x, and the molar amount of titanium dioxide is y.

If carbon is allowed to react in a molar ratio of from 2.7 to 8-fold with tungsten trioxide and titanium dioxide, high levels of process operability are achievable by ensuring smooth progress in carburization of tungsten trioxide and titanium dioxide and keeping the unreacted fraction at a minimal level.

In the present invention, it is advisable to avoid using very coarse grades carbon powder so that a homogeneous mixing of the reactants is achieved. Carbon powder with smaller particle size than that of the reducing agent can be suitably used.

The mixing time in the mixing step is not particularly limited as long as there is enough time for the starting materials to thoroughly mix, and a wide range of variations can be made to the mixing time in consideration of factors such as the particle sizes of the starting materials and the method of mixing.

In the following synthesis step, the reaction mixture obtained is heated at a temperature from about 600° C. to about 1200° C. to produce reaction products including composite carbides of tungsten titanium carbide. This heating forms a reactive atmosphere for each starting material and reduction towards the metallic state takes place for tungsten trioxide and titanium dioxide, followed by carburization. As in the aforementioned mixing step, the synthesis step is preferably carried out under an inert atmosphere, e.g., vacuum or inert atmospheres of argon, hydrogen or methane. In a specific embodiment of the present invention, the synthesis step is carried out under a non-vacuum, inert gas atmosphere at a pressure of about 0.1 kgf/cm$^2$ to about 10 kgf/cm$^2$.

The heating is carried out at a suitable rate so that the temperature is raised up to a point at which the above reaction effectively proceeds. Then the reaction is allowed to proceed for a sufficient amount of time at this target temperature. The maximum target temperature at this stage can be preferably set at from about 600° C. to about 1200° C. to afford a high yield for tungsten titanium carbide. In a specific embodiment of the present invention, the synthesis step is carried out at a temperature from about equal to the melting point of the reducing agent or higher to about 1200° C. or below.

If the reaction is run above the melting point of the reducing agent, then the reducing agent is present in a liquid state and the increased fluidity significantly improves mass distribution in the reaction system. The improved mass distribution in turn leads to homogeneous and spheroidized tungsten titanium carbide.

The vessel for the reaction mixture is not particularly limited provided it is made out of a material capable of withstanding the reaction temperature. Carbonaceous containers are suitably used to avoid contamination of the powder from local side reactions induced by the heat of the reaction as may be seen in glass or ceramic containers.

Following the synthesis step, the washing step is carried out in which the reaction mixture is washed with water to remove the oxidized waste of the reducing agent (CaO, MgO, etc.) present in the reaction products. Since calcium oxide and/or magnesium oxide, formed as reaction byproducts in the present invention, readily dissolve in water, a simple washing with water is able to remove them from the products. Accordingly, the present invention is capable of providing high purity tungsten titanium carbide with ease due to its simple and facile byproduct removal as explained above.

The inventive method, if need be, may further comprise the step of aqueous acid treatment for the tungsten titanium carbide washed with water. Minute quantities of impurities present after washing with water can be removed with such acids as sulfuric acid, nitric acid, hydrochloric acid, acetic acid and mixtures thereof to afford even higher purity tungsten titanium carbide product.

The inventive method, if need be, may further comprise the step of heat treating water-washed tungsten titanium carbide powder with a heating apparatus.

The average particle size of the tungsten titanium carbide powder prepared according to the present invention as set forth above ranges in the ultrafine grade of from about 300 nm to about 1 µm, more specifically from about 400 nm to about 550 nm, and still more specifically from about 400 nm to about 500 nm.

EXAMPLES

Certain embodiments of the invention are illustrated by the following non-limiting examples.

Example 1

0.7 moles of tungsten trioxide, 0.3 moles of titanium dioxide and 1.2 moles of carbon (carbon black) were wet-mixed and dried. Then the reaction vessel was filled with nitrogen to prevent oxidation and 4.0 moles of calcium as a reducing agent was dry-mixed therein for an hour. All materials had a purity of at least 99%.

The resultant reaction mixture was placed into an electric furnace via a carbonaceous chamber. In advance of heating this mixture in the electric furnace, vacuum was applied and a flow of argon gas was let in, with the argon pressure maintained at 1.0 kgf/cm$^2$ throughout the reaction. The heating rate of the electrical furnace was 5.5° C./min with the peak temperature set at 890° C.

The reaction mixture was allowed to react for half an hour at the peak temperature and the reaction products were washed with distilled water upon completion of the reaction. The washed mixture underwent the final impurity removal step with dilute hydrochloric acid to remove last traces of moisture. The product composite carbide powder thus obtained was found to be pure tungsten titanium carbide (WTiC) as determined by X-ray diffraction (XRD) and field emission scanning electron microscopy (FE-SEM) analysis and had an average particle size $D_{50}$ of 530 nm or less.

Example 2

Under a vacuum, 0.7 moles of tungsten trioxide, 0.3 moles of titanium dioxide, 3.0 moles of carbon and 8.0 moles of magnesium were dry-mixed for 40 minutes, with each material having a purity of at least 99%.

The resultant reaction mixture was placed into an electric furnace via a metal crucible. In advance of heating this mixture in the electric furnace, vacuum was applied and the reaction was carried out under a vacuum. The heating rate of the electrical furnace was 5.5° C./min with the peak temperature set at 690° C.

The reaction mixture was allowed to react for 3 hours at 690° C. and the reaction products were washed with distilled water upon completion of the reaction. The washed mixture underwent the final impurity removal step with dilute acetic acid followed by a heat treatment to remove last traces of moisture. The product composite carbide powder thus obtained was found to have the composition of pure WTiC as determined by XRD and FE-SEM analysis and had an average particle size $D_{50}$ of 400 nm or less.

Example 3

0.7 moles of tungsten trioxide, 0.3 moles of titanium dioxide and 2.0 moles of carbon (carbon black) were wet-mixed and dried. Then the reaction vessel was filled with argon to prevent oxidation and 3.0 moles of calcium and 2.5 moles of magnesium as reducing agents were dry-mixed therein for 2 hours, with each material having a purity of at least 99%.

The resultant reaction mixture was placed into an electric furnace via a carbonaceous crucible. In advance of heating this mixture in the electric furnace, vacuum was applied and a flow of hydrogen gas was let in, with the hydrogen pressure maintained at 3.0 kgf/cm$^2$ throughout the reaction.

The heating rate of the electrical furnace was 5.5° C./min with the peak temperature set at 850° C.

The reaction mixture was allowed to react for an hour at 850° C. and the reaction products were washed with distilled water upon completion of the reaction. The washed mixture underwent the final impurity removal step with dilute hydrochloric acid to remove last traces of moisture. The product composite carbide powder thus obtained was found to have the composition of pure WTiC as determined by XRD and FE-SEM analysis and had an average particle size $D_{50}$ of 500 nm or less.

Example 4

Under a nitrogen atmosphere, 0.7 moles of tungsten trioxide, 0.3 moles of titanium dioxide (rutile), 1.0 moles of carbon (carbon black) and 4.5 moles of calcium were dry-mixed for 2 hours, with each material having a purity of at least 99%.

The resultant reaction mixture was placed into an electric furnace via a metal crucible. In advance of heating this mixture in the electric furnace, vacuum was applied and a flow of methane gas was let in, with the methane pressure maintained at 5.0 kgf/cm$^2$ throughout the reaction. The heating rate of the electrical furnace was 5.5° C./min with the peak temperature set at 870° C.

The reaction mixture was allowed to react for 15 minutes at 870° C. and the reaction products were washed with distilled water upon completion of the reaction. The washed mixture underwent the final impurity removal step with dilute acetic acid followed by a heat treatment to remove last traces of moisture. The product composite carbide powder thus obtained was found to have the composition of pure WTiC as determined by XRD and FE-SEM analysis and had an average particle size $D_{50}$ of 550 nm or less.

Figure 2A:
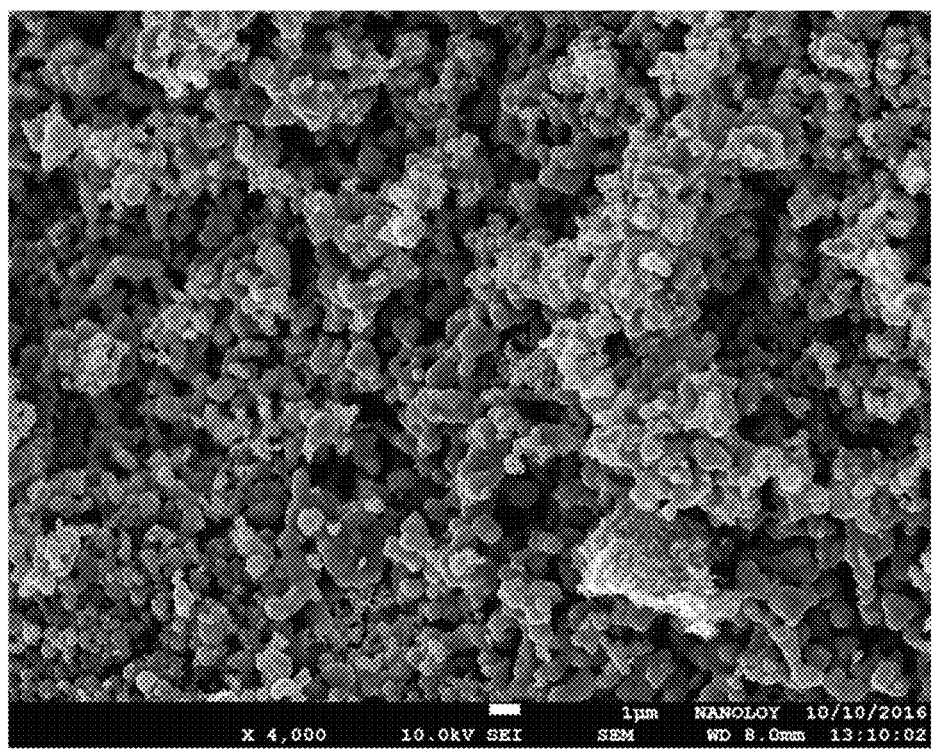
FIGS. 2a to 2d are field emission scanning electron microscopy (FE-SEM) photographs of the embodiments of the present invention (Examples 1 to 4, respectively), taken after the completion of the synthesis reaction but before the washing step, showing the admixture in which tungsten titanium composite carbide is present together with the byproducts of CaO and MgO.
Figure 2B:
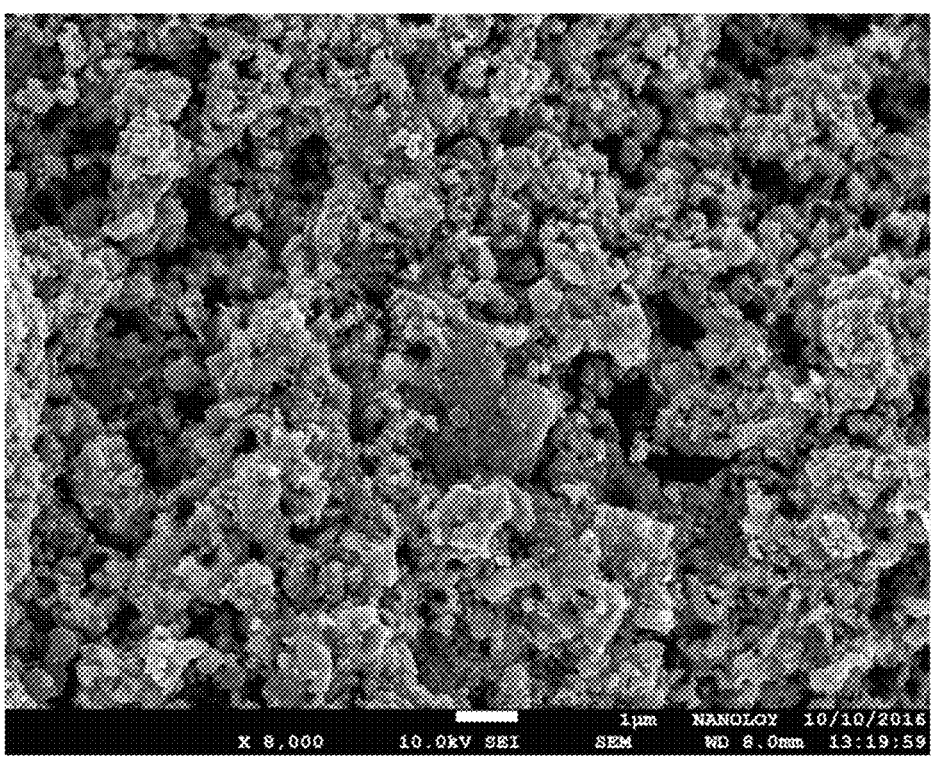
Figure 2C:
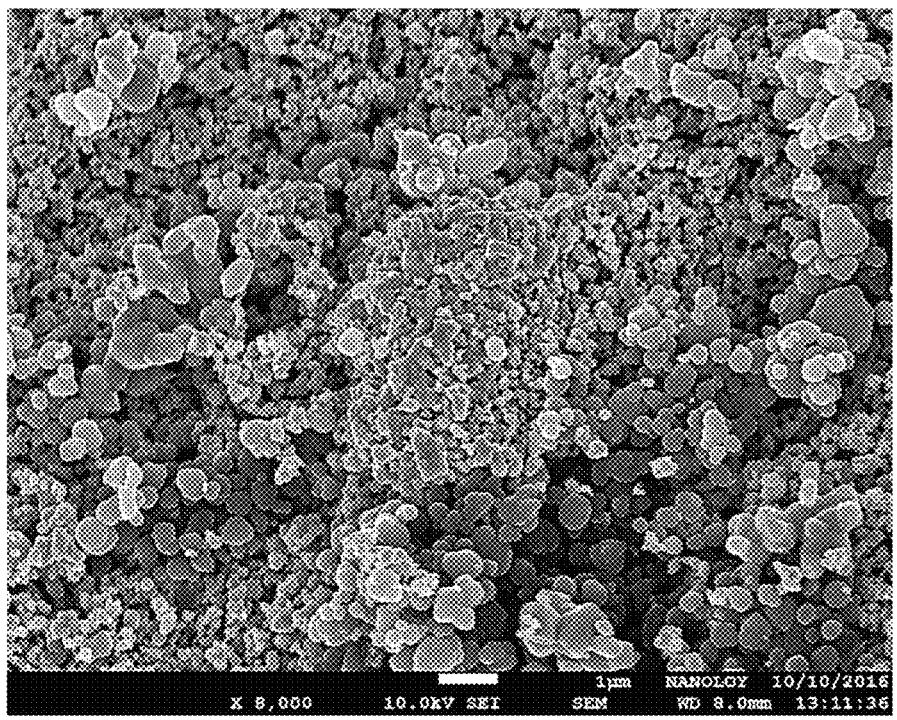
Figure 2D:
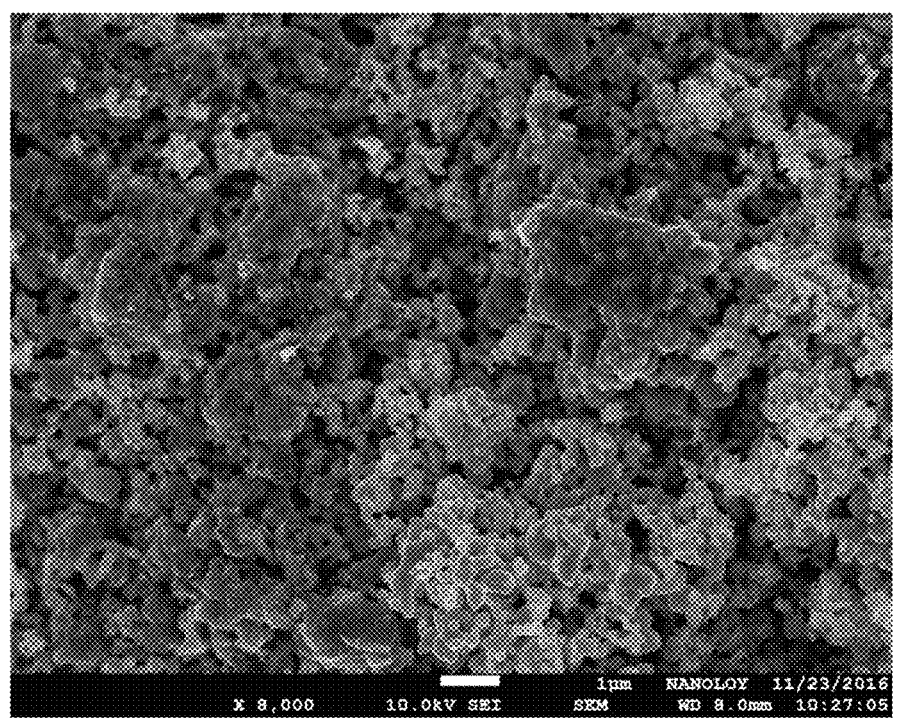

For reference, the FE-SEM photographs for the WTiC powder before the washing step with water and in mixture with CaO or MgO from Examples 1 and 2-4 are presented in FIGS. 2a to 2d, respectively.

Figure 3:
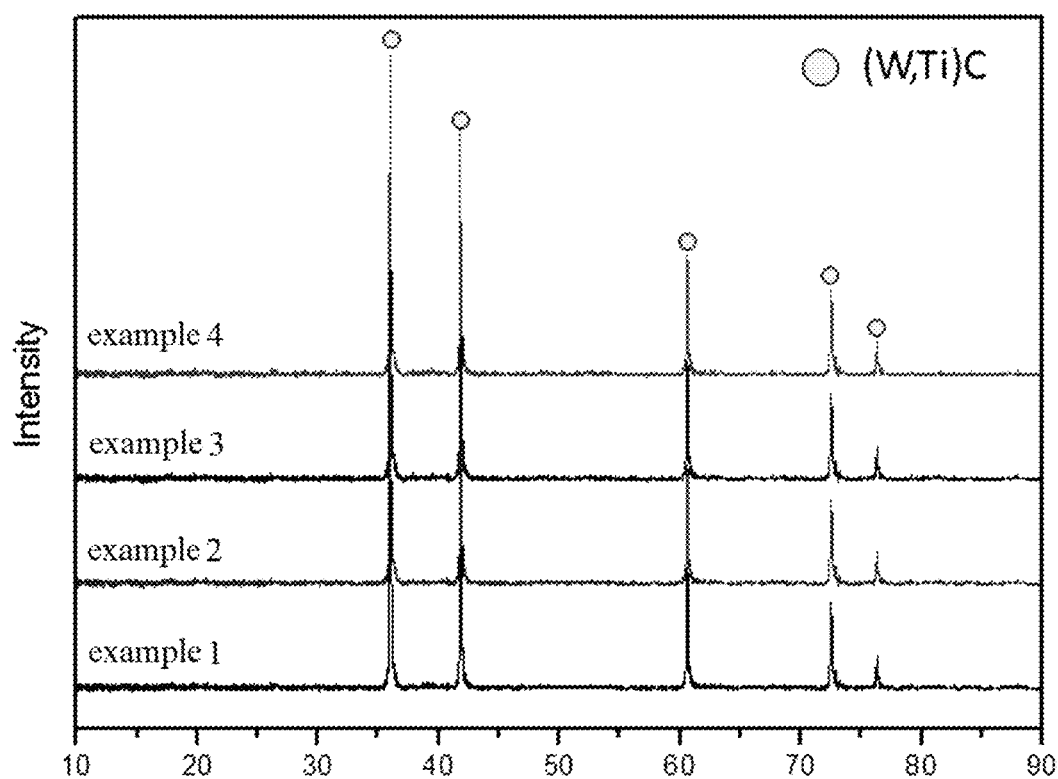
FIG. 3 is shows an X-ray diffractogram of the powdered composite carbide of tungsten and titanium according to an embodiment of the present invention.
Figure 4A:
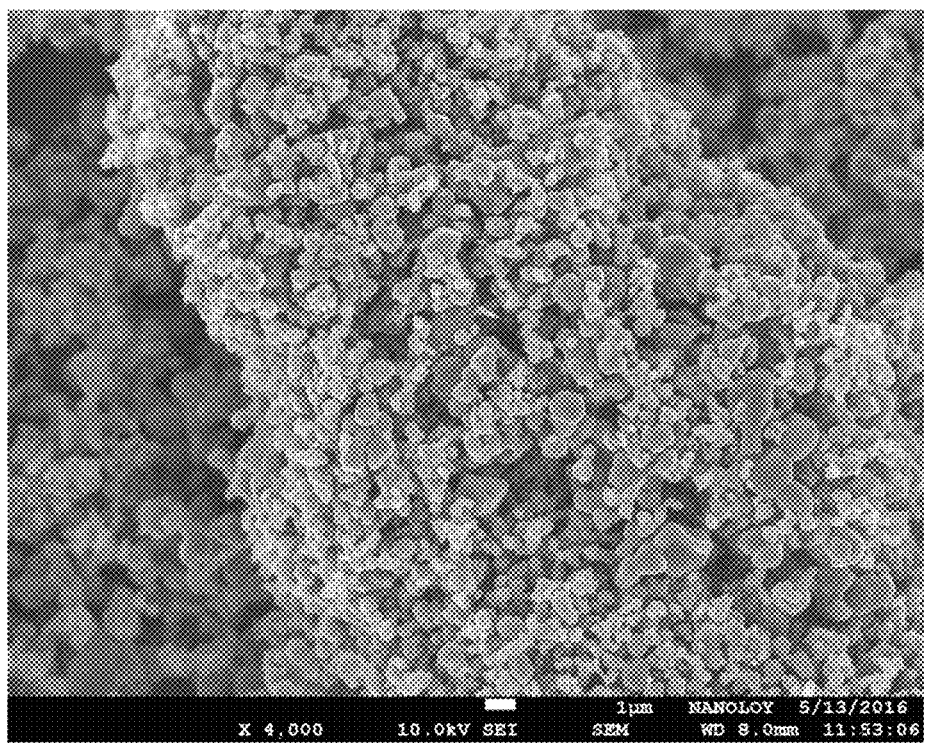
FIGS. 4a to 4d are FE-SEM photographs of tungsten titanium composite carbide obtained from the embodiments of the present invention corresponding to FIGS. 2a to 2d, respectively. The photographs were taken after washing the reaction products with water.
Figure 4B:
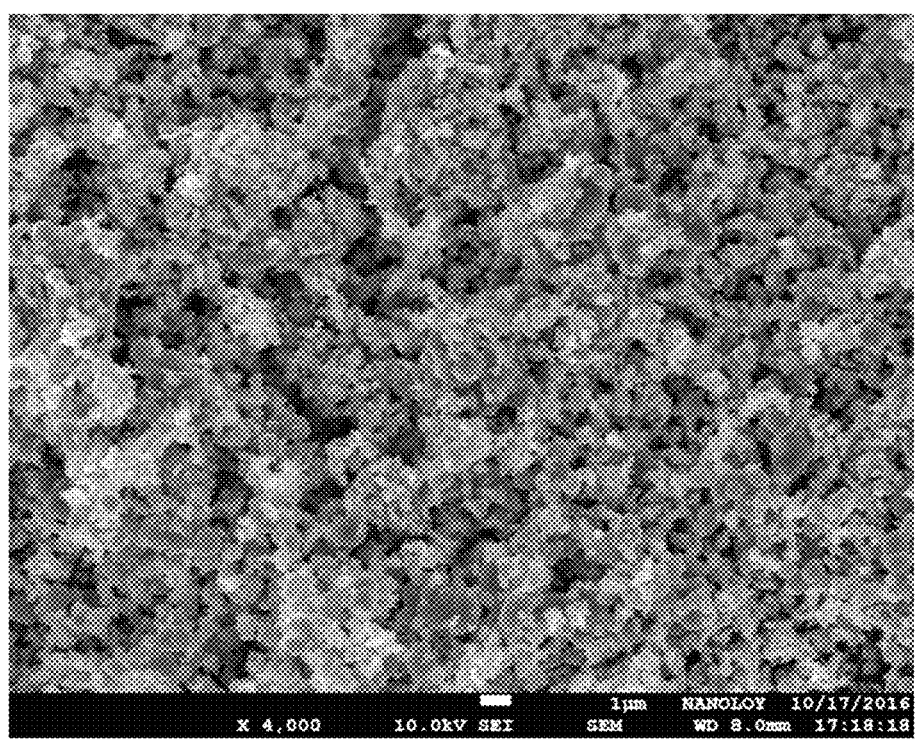
Figure 4C:
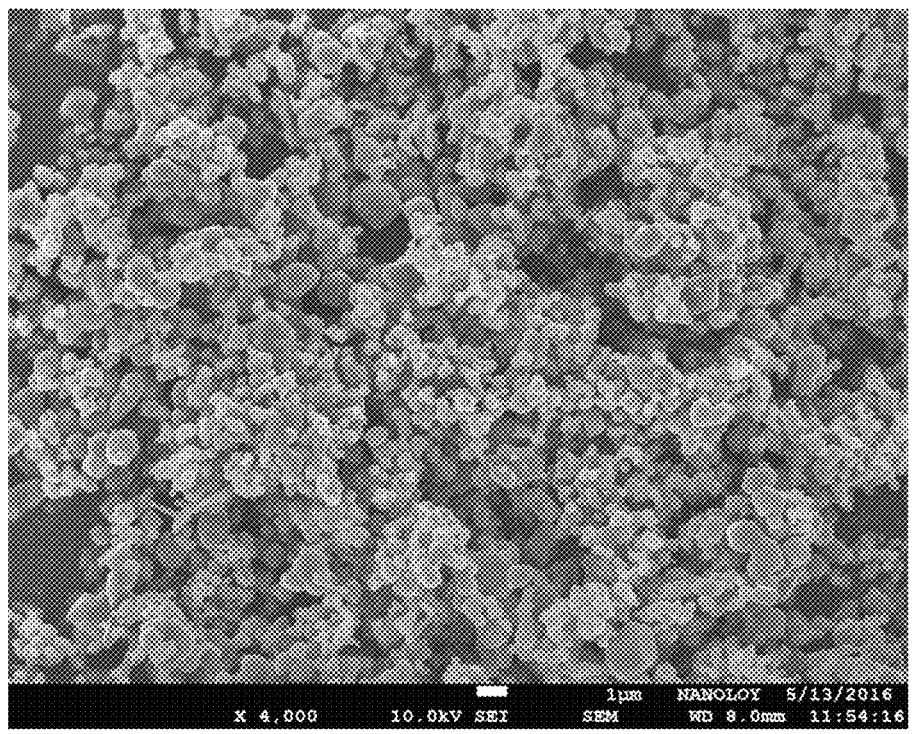
Figure 4D:
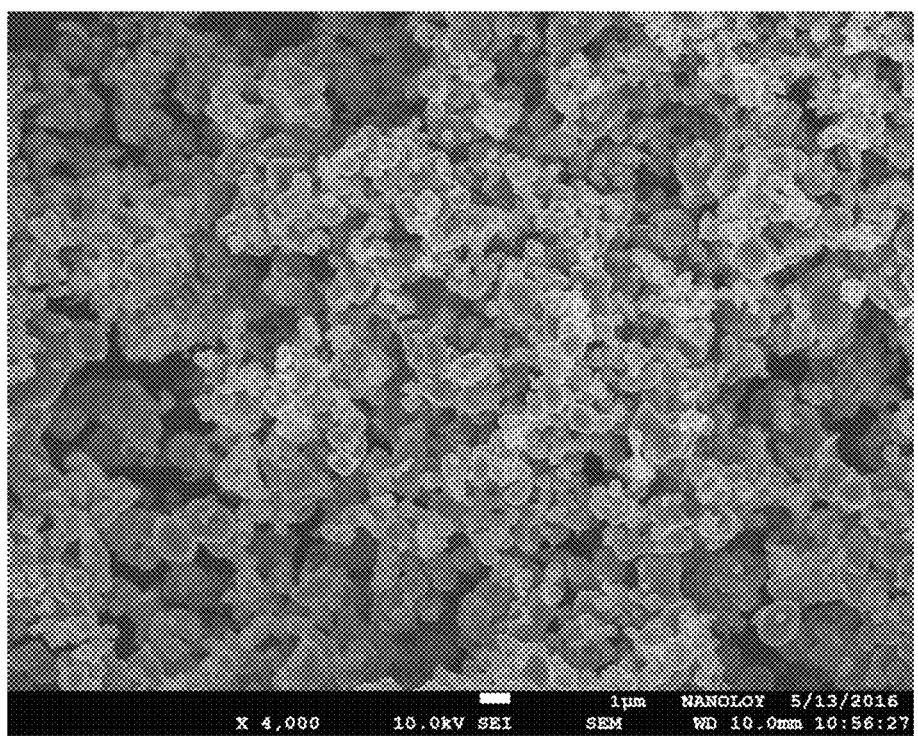

FIG. 3 and FIGS. 4a to 4d respectively represent the X-ray diffractogram and FE-SEM photograph for the WTiC powder prepared according to Examples 1 and 2-4, respectively.

Although the foregoing invention has been described in some detail by way of specific embodiments and drawings, by no means is the present invention limited thereto. Those skilled in the art may recognize various changes, modifications and other equivalents to the specific embodiments described herein without departing from the technical idea or the scope encompassed in the claims attached hereto.

What is claimed is:

1. A method for preparing tungsten titanium carbide powder, the method comprising the steps of:
   a mixing step for mixing under an inert atmosphere tungsten trioxide (WO$_3$), titanium dioxide (TiO$_2$) and carbon (C), each being in powdered form, with a reducing agent powder to obtain a reaction mixture;
   a synthesis step for heating the reaction mixture at a temperature of about 600° C. to 1200° C. to obtain the reaction products; and
   a washing step for washing the reaction products with water;
   wherein the composition of the reaction mixture is such that the molar amount of the reducing agent is 8(x+y) or lower, and the molar amount of carbon is from about 2.7 times (x+y) to about 8 times (x+y), provided that x is the molar amount of tungsten trioxide and y is the molar amount of titanium dioxide; and
   wherein the reducing agent is selected from calcium and/or magnesium, the molar amount of the reducing agent being the sum amount of the calcium and/or magnesium in moles.

2. The method of claim 1, wherein the synthesis step is carried out under an inert atmosphere of vacuum, argon, hydrogen or methane.

3. The method of claim 2, wherein the inert atmosphere is not a vacuum, and the synthesis step is carried out under a pressure of about 0.1 kgf/cm$^2$ to about 10 kgf/cm$^2$.

4. The method of claim 1, wherein the mixing step is carried out by either
   dry-mixing the entire components of the reaction mixture or
   wet-mixing all the components of the reaction mixture except the reducing agent, followed by drying the resultant mixture and dry mixing the reducing agent therein.

5. The method of claim 1, wherein the synthesis step is carried out at a temperature equal to or higher than the melting point of calcium.

6. The method of claim 1, further comprising washing with an aqueous acid after the washing step.

7. The method of claim 6, wherein the aqueous acid is selected from the group consisting of sulfuric acid, nitric acid, hydrochloric acid, acetic acid and mixtures thereof.

8. The method of claim 1, wherein the average particle size $D_{50}$ of the tungsten titanium carbide powder obtained is from about 400 nm to about 550 nm.

* * * * *